US006879675B2

United States Patent
Chidambaram

(10) Patent No.: US 6,879,675 B2
(45) Date of Patent: Apr. 12, 2005

(54) TOLL SAVING CALL FEATURE FROM A REMOTE SITE TO INITIATE A CALL THROUGH A CPE THAT SUPPORTS 3 WAY CALLING

(75) Inventor: Dinakaran Chidambaram, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 225 days.

(21) Appl. No.: 10/146,459

(22) Filed: May 15, 2002

(65) Prior Publication Data

US 2003/0215076 A1 Nov. 20, 2003

(51) Int. Cl.[7] .............................................. H04M 3/42
(52) U.S. Cl. .......................... 379/210.01; 379/207.02; 379/201.02
(58) Field of Search ...................... 379/207.02, 210.01, 379/209.01, 207.01, 211.01, 211.02, 88.18, 88.19, 100.06, 201.01–201.04

(56) References Cited

U.S. PATENT DOCUMENTS

| | | | | | |
|---|---|---|---|---|---|
| 5,937,050 | A | * | 8/1999 | Yue et al. | 379/100.06 |
| 6,295,341 | B1 | * | 9/2001 | Muller | 379/88.18 |
| 6,393,108 | B1 | * | 5/2002 | McElwee | 379/88.19 |

* cited by examiner

*Primary Examiner*—Benny Tieu
(74) *Attorney, Agent, or Firm*—Joseph S. Tripoli; Harvey D. Fried; Joseph J. Kolodka

(57) ABSTRACT

A telephone system includes a storage device, which receives a telephone number and stores the telephone number. A customer premises equipment (CPE) device includes a three-way calling feature such that the stored telephone number is enabled to be called from the CPE over a switched network and a connection is made by the CPE over the switched network between the telephone number and a user at a location remote from the CPE.

14 Claims, 4 Drawing Sheets

TOLL SAVING CALL FEATURE FROM A REMOTE SITE TO INITIATE A CALL THROUGH A CPE THAT SUPPORTS 3 WAY CALLING

FIELD OF THE INVENTION

The present invention generally relates to network communications and, more particularly, to a method and system for providing a remotely initiated three way call using customer premises equipment (CPE).

BACKGROUND OF THE INVENTION

Caller identification (caller ID) is typically supported at customer premise equipment (CPE) as a feature offered by a service provider. Additionally, most CPE's (like answering machines) permit the retrieval of information using a call-in procedure typically with a built in security mechanism. Such security systems may include a password access security system. Caller ID permits the CPE to detect and display information about an incoming call. There are existing standards that permit this information to be exchanged between a central office (CO) or a Stored-Program Control Switching System (SCPS) and the CPE. Two common information exchange types that have been standardized include:

1) Type I: In this mode of operation, the phone at the CPE is on-hook. The caller ID information is sent to the CPE by the SCPS as frequency shift key (FSK) information when power ringing is applied. This mode does not directly support the concept of an off-hook signaling protocol.

2) Type II: This mode is a superset of the Type I mode of operation. In addition to supporting Type I signaling, this mode of operation supports an off-hook caller ID feature in conjunction with call waiting. The CO sends a CPE Alerting Signal (CAS), which is to be acknowledged by the CPE. This is followed by a Frequency Shift Key (FSK) data burst that embeds a single message or multiple messages according to some specified format.

A typical system, which supports caller ID (Type I and Type II) functionality, is shown in FIG. 1. A plain old telephone system (POTS) line 10 connected to a network 8 is terminated into a caller ID module 12 which is then connected to a telephone handset 14. Caller ID module 12 displays telephone numbers of remote handsets 15 when they call telephone 14. For supporting a Type I Caller ID function, there is no information exchanged between the handset 14 and the caller ID module 12. In this case, when the handset 14 is on-hook, incoming caller ID information gets automatically recorded and can be displayed on a display on the handset 12. Playback of this information can be accomplished either at a CPE 16 or remotely using a call-in procedure with some built-in security (such as a password).

It would be advantageous to provide a method and system, which provides a remotely initiated three-way calling feature, which employs numbers stored in a CPE. It would also be advantageous to provide a system and method which implements a callback mechanism implemented based on stored numbers in the CPE.

SUMMARY OF THE INVENTION

A telephone system includes a storage device, which receives a telephone number and stores the telephone number. A customer premises equipment (CPE) device includes a three-way calling feature such that the stored telephone number is enabled to be called from the CPE over a switched network and a connection is made by the CPE over the switched network between the telephone number and a user at a location remote from the CPE.

A toll saving telephone system includes a customer premises equipment (CPE) device having a three-way calling feature. The CPE device is operatively connected to a switched network. A storage device is collocated with the CPE, and the storage device stores a telephone number entered by a user from a remote location. A callback mechanism is located at the CPE device, which calls the telephone number entered by the user to create a connection between the user and the telephone number such that toll charges are incurred at the CPE location.

A method for callback of a stored telephone number includes storing a first telephone number at a customer premises, providing a customer premises equipment (CPE) device having a three-way calling feature, initiating a telephone call from the CPE device in accordance with the stored first telephone number, and connecting a remote user to the first telephone number through the CPE device.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention provides a method and system for initiating telephone services from a remote location. In particularly useful embodiments, a customer premise equipment (CPE) device is employed for storing and initiating services, such as, e.g., a remotely initiated three-way calling feature that employs numbers stored in the CPE. The present invention also provides a system and method which implements a callback mechanism based on stored numbers in the CPE.

It is to be understood that the present invention is described in terms of a service network capable of providing caller ID services; however, the present invention is much broader and may include any service provided over a switched network. In addition, the present invention is applicable to any storage device at the customer's location including telephone, wireless telephones, set top boxes, computers, satellite boxes, etc. The present invention may be extended to cable, wireless or other network types and may include a plurality of different transfer modes and technologies.

It should be understood that the elements shown in the FIGS. may be implemented in various forms of hardware, software or combinations thereof. Preferably, these elements are implemented as a combination of hardware and software on one or more appropriately programmed general-purpose devices, which may include a processor, memory and input/output interfaces.

Figure 1:
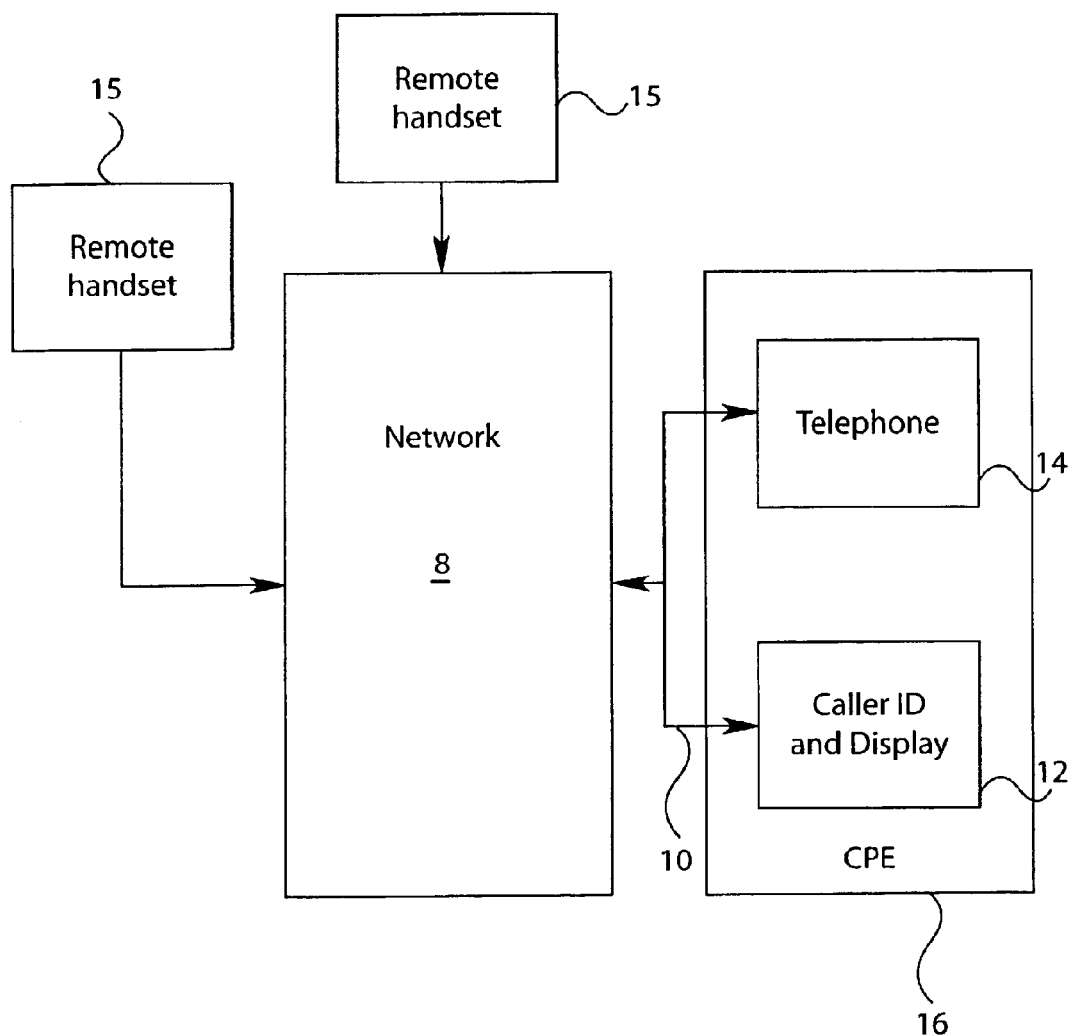
FIG. 1 is a prior art system for caller identification.
Figure 2:
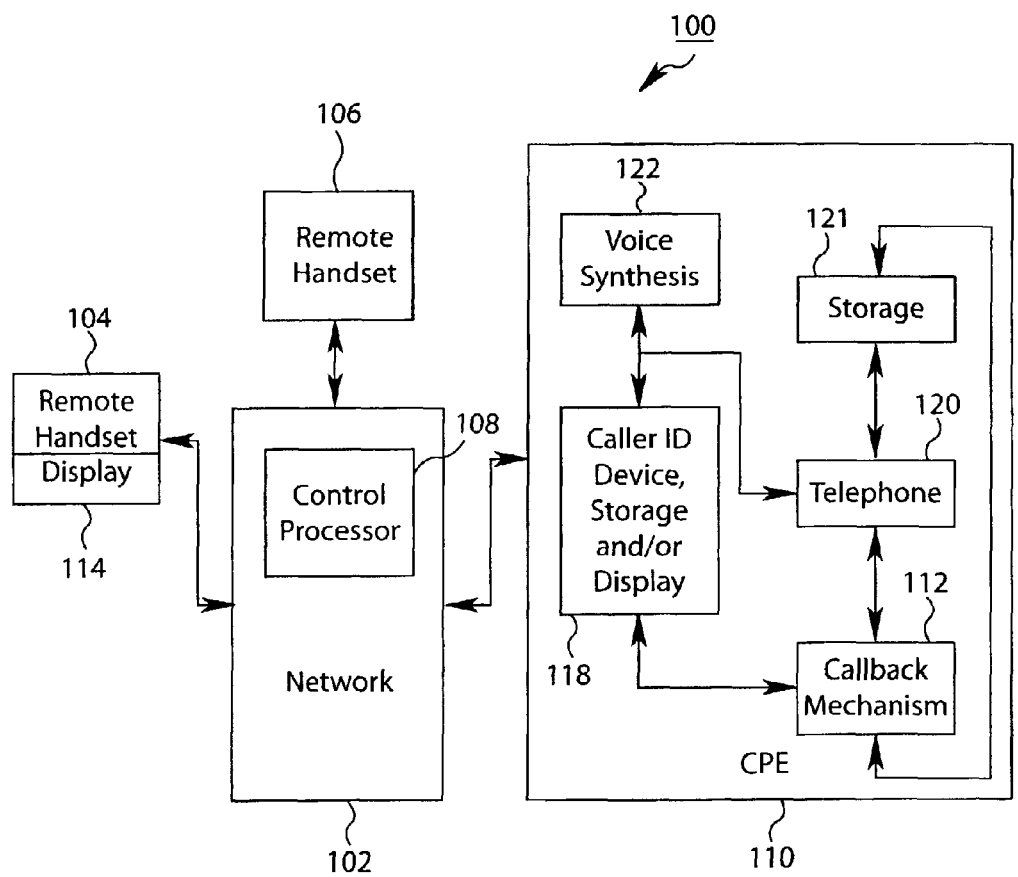
FIG. 2 is a schematic block diagram showing a telephone system having a remote callback feature in accordance with the present invention.

Referring now in specific detail to the drawings in which like reference numerals identify similar or identical elements throughout the several views, and initially to FIG. 2, a telephone system architecture 100 includes a network 102. Network 102 may include a public switched telephone network (PSTN), which has one or more central offices. Network 102 may further include a digital subscriber line (DSL) head-end network or other local head-end network types. Details of individual components making up system architecture 100 are known to those skilled in the art, and will only be described in details sufficient for an understanding of the present invention.

Network 102 connects to a plurality of remote telecommunications devices 104 and 106. Devices 104 and 106 may include telephones, personal digital assistants, computers, cellular telephones or any other suitable communications devices capable of initiating/receiving a telephone call. Network 102 preferably includes a control processor 108, which provides a caller ID function and other functions to subscribers.

When enabled at a central office using a control processor 108, caller ID information is made available in digital form at telephone customer premises equipment (CPE) 110 for a given subscriber. For example, if a user calls back into their CPE 110 from a remote location, say from telephone 104, it is possible to retrieve the caller ID information and scroll through a listing of caller ID entries, either visually (e.g., on a display) or audibly (e.g., through voice synthesis). Further, by using the stored caller ID information in CPE 110, an automatic call back mechanism 112 can be employed to initiate a call, if CPE 110 supports 3-way calling. For example, if the user wants to reply to a caller (using the caller ID information) from a remote location, the user can call CPE 110 and initiate a call from CPE 110 using callback mechanism 112. Callback mechanism 112 may employ technology similar to a redial operation.

Furthermore, the user can retrieve the callback information on a display 114 (or through the handset receiver if audibly rendered) and use the call back mechanism 112 by employing the stored numbers in CPE 110. For example, if the caller needs the stored number in the CPE 110 (e.g., the numbers stored in the telephone memory), the caller can retrieve the numbers from the CPE 110. In this way, three-way calling may be initiated from a remote location (104 or 106) to call back a caller whose information is stored in a caller ID storage feature 118 of CPE 110. Device 120 preferably includes a telephone, but may include a personal digital assistant, a computer, a cellular telephone or any other suitable communications device capable of initiating/receiving a telephone call.

In addition, if a caller wants to use a Toll Saving Call Feature from a remote site to initiate a call through a CPE 110 that supports 3-way calling, the caller from the remote location preferably connects to CPE 110, and initiates a 3-way call to contact a third party at a second remote location (e.g. device 106). If the numbers are not stored in the CPE another way to initiate the call may include getting the information (e.g., the telephone number) from the caller before making a three-way call and entering the number into the CPE 110. CPE 110 stores the information in data storage 121 or in caller ID 118. Then, CPE 110 is prompted to make a call to the remotely entered number. In this way, a remote user initiates a call from the location of CPE 110 to save call tolls or long distance charges. Alternately, the remote user may initiate a call from CPE 110 in accordance with the stored number and initiate a call to him using callback feature 112. In this way, CPE 110 calls both the subscriber and an identified caller. All calls originate from CPE 110. This is also provides a toll saving feature by using, for example, a home telephone calling plan at the CPE's location, such as an international calling plan, when the call is initiated from a location other than at the CPE's location (i.e., the home location).

All the above-mentioned functions can be integrated into a single unit device, e.g., CPE 110, and can be accomplished in an analog or digital manner. The callback mechanism 112 of the present invention may be implemented using stored numbers entered or identified through caller ID into CPE 110. When a callback is requested, the number selected or indicated by the remote user is employed to dial up the telephone device of the caller. This extends a caller ID function and CPE handset to allow callback mechanism 112 from a remote location.

When remote access is initiated, any existing information that has been recorded in a caller ID device 118 can be played back to the remote user. The information can be sent back to the remote user using a voice synthesis mechanism 122 or simply textually displayed on, e.g., a telephone display. Further, callback mechanism 112 provides a callback of numbers stored in caller ID device 118, stored in CPE 110 or entered in by the user. For example, if the user has a 3-way calling feature in his/her home, the caller can initiate a 3-way call from a remote location. Once the caller initiates a 3-way call the CPE goes through the following sequence as illustratively shown and described in FIGS. 3 and 4.

Figure 3:
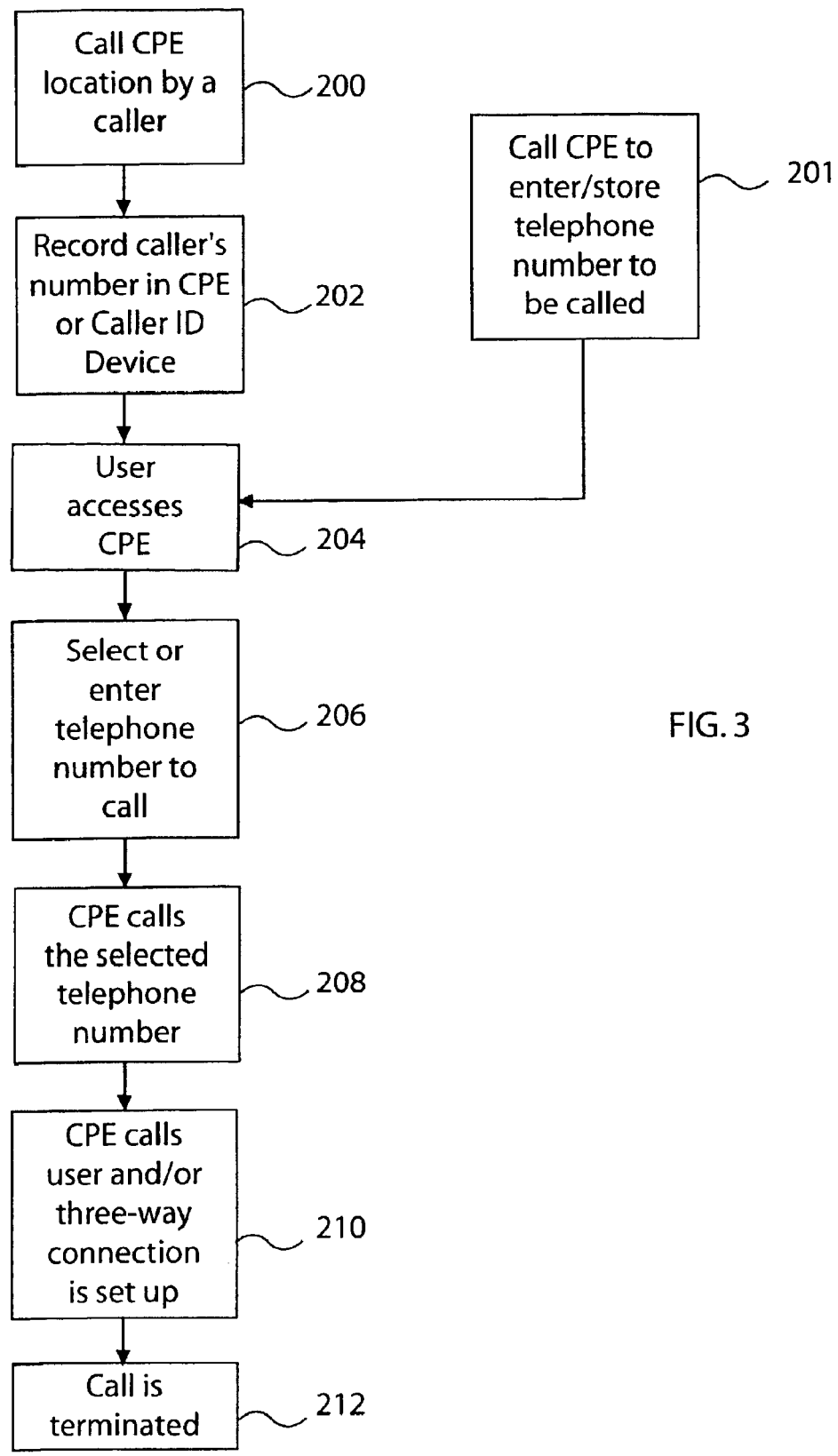
FIG. 3 is a block/flow diagram showing an illustrative method for calling back a caller from a remote location in accordance with one embodiment of the present invention.

Referring to FIG. 3, a flow diagram illustratively shows a method for remote callback of a stored telephone number (e.g., an entered or a caller ID stored number) in accordance with the present invention. In block 200, a first caller makes a telephone call to a CPE unit of a subscriber of three-way calling. In block 202, the telephone number of the first caller is recorded in a caller ID device or on the CPE unit. Alternately, a caller calls the CPE and enters their telephone number into the CPE to enable a remote subscriber to call them if caller ID is not available, in block 201. In block 204, a user or subscriber makes a remote telephone call to the CPE unit. In block 206, the user selects the telephone number from a listing of one or more numbers to call back a caller (e.g., the first caller). This may be performed by activating the FLASH or other selection mechanism, e.g., a "#" key or other key on a telephone keypad. Scrolling of numbers in the list may be also enabled by hitting a key on the keypad. The CPE dials the requested/selected number, in block 208, to get the first caller on the line.

In block 210, a connection is made with the user, e.g., the FLASH may be activated again to connect back to the user in the remote location or the user may simply remain on the line until a connection is made by the CPE to another telephone. In this way, a three-way call is set up between the remote user, the CPE and the caller. The three-way call was advantageously initiated remotely. In block 212, the call is terminated, when the remote user hangs up, and the CPE disconnects the 3-way call.

Figure 4:
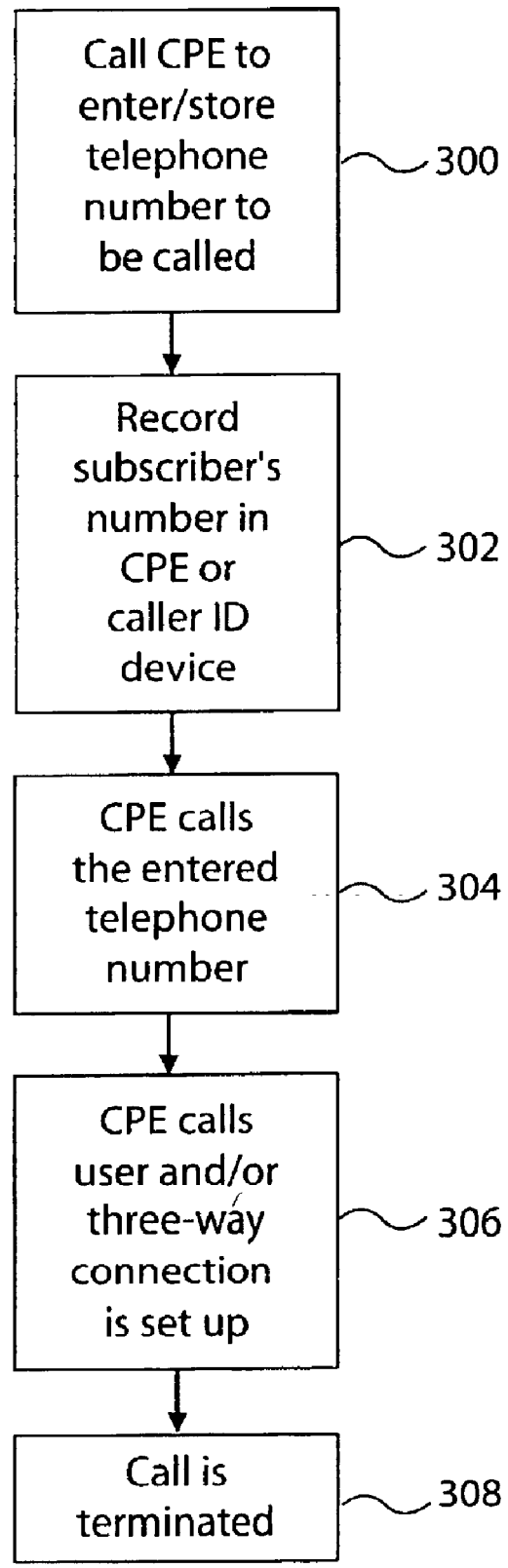
FIG. 4 is a block/flow diagram showing an illustrative method for a toll saving feature in accordance with another embodiment of the present invention.

Referring to FIG. 4, a flow diagram illustratively shows a method for remote callback of a stored telephone number (e.g., an entered or a caller ID stored number) in accordance with the present invention. In block 300, a subscriber or user calls into the CPE and enters a number therein. In block 302, the telephone number of the subscriber is optionally recorded in a caller ID device or on the CPE unit. In block 304, the CPE unit calls a remote telephone in accordance with the subscriber entered telephone number. In block 306, a connection is made to the subscriber, e.g., a FLASH may be activated to connect back to the subscriber in the remote location or the caller ID information for the user is employed to call the user back. In this way, a three-way call is set up between the subscriber, the CPE and the entered telephone number which was dialed remotely from the user (from the CPE). Calls to the remote subscriber and another destination (e.g., at the entered number) may both advantageously be made from the CPE. In this way, the calls made by the CPE employ the subscriber's home calling plan, which may be employed as a toll saving feature for one or both of the calls in accordance with the present invention. In block 308, the call is terminated, when the remote user hangs up and the CPE disconnects the 3-way call.

Having described preferred embodiments for toll saving call feature from a remote site to initiate a call through a CPE that supports 3 way calling (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A telephone system, comprising:
    a storage device which receives a telephone number and stores the telephone number; and
    a customer premises equipment (CPE) device having a three-way calling feature such that the stored telephone number is enabled to be called from the CPE over a switched network and a connection is made by the CPE over the switched network between the telephone number and a user at a location remote from the CPE such that a call to the telephone number and a call to the remote user are both initiated through the CPE wherein the CPE includes an automatic call back mechanism which calls the user at the remote location until an appropriate response is received to initiate a connection with the stored telephone number.

2. The telephone system as recited in claim 1, wherein the storage device is integrated into the CPE device.

3. The telephone system as recited in claim 1, wherein the storage device includes a caller ID device.

4. The telephone system as recited in claim 1, further comprising a voice synthesizer coupled to the storage device to audibly render the stored telephone number to the user over the switched network.

5. The telephone system as recited in claim 1, wherein the storage device stores a plurality of numbers and the telephone system includes means for selecting a stored telephone number.

6. The telephone system as recited in claim 1, further comprising a caller identification (ID) device coupled to the switched network at the CPE location for identifying a telephone number from which a call originates.

7. The telephone system as recited in claim 6, wherein the caller identification (ID) device supplies the stored telephone number.

8. The telephone system as recited in claim 1, wherein the stored telephone number is remotely entered over the switched network.

9. The telephone system as recited in claim 1, wherein the stored telephone number is entered into the CPE by a caller.

10. A method for callback of a stored telephone number, comprising the steps of:
    storing a first telephone number in at a customer premises;
    providing a customer premises equipment (CPE) device having a three-way calling feature;
    initiating a telephone call from the CPE device in accordance with the stored first telephone number; and
    connecting a remote user to the first telephone number through the CPE device such that the telephone call to the first telephone number and a connection to the remote user are both initiated through the CPE wherein the CPE includes an automatic call back mechanism which calls the user at the remote location until an appropriate response is received to initiate a connection with the stored telephone number.

11. The method as recited in claim 10, wherein the step of storing a first telephone number includes entering the first telephone number by a user at a remote location relative to the customer premises.

12. The method as recited in claim 10, wherein the step of storing a first telephone number includes storing the first telephone number of a previous caller by employing a caller identification device.

13. The method as recited in claim 10, wherein the step of storing a first telephone number includes storing a plurality of telephone numbers and the method further comprises the step of selecting one of the plurality of telephone numbers to call.

14. The method as recited in claim 10, further comprising the step of acoustically rendering the stored telephone number to permit a remote user to identify the first telephone number.

* * * * *